US011470035B2

(12) United States Patent
Vendrow

(10) Patent No.: US 11,470,035 B2
(45) Date of Patent: *Oct. 11, 2022

(54) SYSTEMS AND METHODS FOR SUPPRESSING REPETITIVE NOTIFICATIONS ABOUT MESSAGES IN MESSAGING GROUPS

(71) Applicant: RingCentral, Inc., Belmont, CA (US)

(72) Inventor: Vlad Vendrow, Reno, NV (US)

(73) Assignee: RingCentral, Inc., Belmont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,348

(22) Filed: Sep. 1, 2020

(65) Prior Publication Data
US 2020/0403953 A1 Dec. 24, 2020

Related U.S. Application Data

(63) Continuation of application No. 15/908,770, filed on Feb. 28, 2018, now Pat. No. 10,812,435.

(51) Int. Cl.
*H04L 51/224* (2022.01)
*H04L 67/55* (2022.01)
(Continued)

(52) U.S. Cl.
CPC ............ *H04L 51/24* (2013.01); *G06F 40/194* (2020.01); *G06F 40/247* (2020.01); *G06F 40/289* (2020.01); *H04L 67/26* (2013.01)

(58) Field of Classification Search
CPC ......... G08B 5/227; G08B 5/222; H04L 51/14; H04L 51/24; H04L 51/30; H04L 51/38; H04L 51/04; H04L 51/10; H04L 51/12; H04L 51/36; H04L 12/1895; H04L 65/4015; H04L 67/10; H04L 12/18; H04L 12/1859; H04L 12/189; H04L 41/0613; H04L 43/0817; H04L 45/02; H04L 45/16; H04L 51/00; H04L 51/043; H04L 51/046; H04L 51/32; H04L 67/06; H04L 67/1095;
(Continued)

(56) References Cited
U.S. PATENT DOCUMENTS 4,682,165 A 7/1987 Davis
5,347,269 A 9/1994 Vanden Heuvel et al.
(Continued)

FOREIGN PATENT DOCUMENTS

JP 2001-333133 A 11/2001
WO WO 2017/101354 A1 6/2017

*Primary Examiner* — Greg C Bengzon
(74) *Attorney, Agent, or Firm* — Finnegan, Henderson, Farabow, Garrett & Dunner, LLP

(57) ABSTRACT

The present disclosure relates to systems and methods for suppressing repetitive notifications about messages in messaging groups. In one implementation, the system may include a memory storing instructions and a processor configured to execute the instructions. The instructions may include instructions to determine whether a first message in a first message group substantially matches a second message in a second message group; and after it is determined that a user associated with the first message group has accessed the first message, record the second message as a read message responsive to having determined that the same user is associated with the second message group.

14 Claims, 8 Drawing Sheets

(51) Int. Cl.
  *G06F 40/194* (2020.01)
  *G06F 40/247* (2020.01)
  *G06F 40/289* (2020.01)

(58) Field of Classification Search
  CPC ..... H04L 67/26; H04L 67/34; H04L 12/1813;
       H04L 12/1822; H04L 43/16; H04L
       51/063; H04L 65/403; H04L 65/4076;
       H04L 67/306; H04M 1/7255; H04M
       2203/2083; H04M 2207/18; H04M 3/537;
       H04M 3/00; G06Q 10/10; G06Q 10/107;
       G06Q 10/103; G06Q 30/02; G06Q 50/01;
       G06Q 10/101; H04W 4/06; H04W 4/12;
       H04W 4/22; H04W 4/90; H04W 68/04;
       H04W 76/50; H04W 28/00; H04W 4/20;
       H04W 52/028; H04W 68/02; H04W
       68/12; H04W 76/40; H04W 88/023;
       H04W 88/025; H04W 88/06; G06F
       3/0481; G06F 3/04817; G06F 3/0482;
       G06F 3/04845; G06F 3/04847; G06F
       3/04883
  See application file for complete search history.

(56) References Cited

U.S. PATENT DOCUMENTS

| | | | |
|---|---|---|---|
| 5,809,016 A | 9/1998 | Kreitzer et al. | |
| 7,301,448 B1 * | 11/2007 | Usery | H04L 43/0817 |
| | | | 340/520 |
| 7,409,204 B2 | 8/2008 | Chaudry et al. | |
| 7,529,817 B2 | 5/2009 | Kim | |
| 7,610,043 B2 | 10/2009 | Bae | |
| 8,015,152 B2 | 9/2011 | Ozhan | |
| 8,439,759 B1 | 5/2013 | Mello | |
| 8,495,161 B2 | 7/2013 | Lin | |
| 8,660,054 B2 | 2/2014 | Kolbe | |
| 8,665,066 B2 | 3/2014 | Ryoo | |
| 8,706,824 B2 | 4/2014 | Davenport et al. | |
| 8,819,132 B2 * | 8/2014 | Serr | H04L 51/04 |
| | | | 709/204 |
| 8,819,815 B1 | 8/2014 | Lee | |
| 9,146,656 B1 * | 9/2015 | Srinivasan | G06F 16/957 |
| 9,349,120 B2 * | 5/2016 | Kalu | H04L 51/24 |
| 9,386,436 B2 | 7/2016 | Grzywacz et al. | |
| 9,417,759 B1 * | 8/2016 | Srinivasan | G06F 3/0483 |
| 9,461,833 B1 * | 10/2016 | Marra | H04L 67/26 |
| 9,473,428 B1 * | 10/2016 | Koum | H04L 51/046 |
| 9,544,359 B1 * | 1/2017 | Hunt | H04L 51/043 |
| 9,667,769 B2 | 5/2017 | Clarke | |
| 9,729,555 B2 | 8/2017 | Ferguson | |
| 9,800,529 B2 * | 10/2017 | Malik | H04L 51/08 |
| 9,929,994 B2 * | 3/2018 | Hamlin | H04L 51/08 |
| 9,971,500 B2 * | 5/2018 | Yang | H04M 1/72436 |
| 10,027,614 B1 | 7/2018 | Agrawal | |
| 10,085,141 B1 | 9/2018 | Huang | |
| 10,097,496 B2 | 10/2018 | Dye | |
| 10,243,903 B2 * | 3/2019 | DeLuca | H04L 51/32 |
| 10,264,121 B2 * | 4/2019 | Mitchell | H04L 12/1895 |
| 10,356,745 B2 * | 7/2019 | Karimli | H04W 4/14 |
| 10,491,555 B2 * | 11/2019 | Narasimhan | H04W 12/37 |
| 10,523,624 B2 * | 12/2019 | Lambert | H04L 51/32 |
| 10,530,731 B1 | 1/2020 | Wu | |
| 10,671,402 B2 * | 6/2020 | Kumar | H04L 51/12 |
| 11,122,158 B2 * | 9/2021 | Christie | H04M 1/72436 |
| 2002/0138582 A1 | 9/2002 | Chandra | G06Q 10/107 |
| | | | 709/206 |
| 2002/0156854 A1 | 10/2002 | Matsumoto | |
| 2004/0002958 A1 * | 1/2004 | Seshadri | H04L 51/24 |
| 2004/0002972 A1 * | 1/2004 | Pather | G06F 9/542 |
| 2004/0102185 A1 | 5/2004 | Takami | |
| 2005/0038791 A1 | 2/2005 | Ven | |
| 2005/0216568 A1 * | 9/2005 | Walkush | G06Q 10/107 |
| | | | 709/207 |
| 2006/0020677 A1 * | 1/2006 | von Koch | H04L 51/24 |
| | | | 709/207 |
| 2006/0166651 A1 | 7/2006 | Kim | |
| 2006/0242234 A1 | 10/2006 | Counts | |
| 2007/0100951 A1 | 5/2007 | Bae | |
| 2007/0201086 A1 | 8/2007 | Kim | |
| 2007/0233790 A1 | 10/2007 | Agarwal | |
| 2007/0294366 A1 | 12/2007 | Ozzie | |
| 2008/0037722 A1 * | 2/2008 | Klassen | H04M 1/7243 |
| | | | 379/88.12 |
| 2008/0107057 A1 | 5/2008 | Kannan | |
| 2008/0162510 A1 * | 7/2008 | Baio | G06Q 30/02 |
| 2009/0077045 A1 * | 3/2009 | Kirchmeier | H04M 3/5116 |
| 2009/0248806 A1 | 10/2009 | Teman | |
| 2009/0249247 A1 | 10/2009 | Tseng | |
| 2009/0282100 A1 | 11/2009 | Kim | |
| 2010/0035575 A1 | 2/2010 | Wu | |
| 2010/0075625 A1 | 3/2010 | Wu | |
| 2010/0107088 A1 * | 4/2010 | Hunt | H04L 67/10 |
| | | | 715/752 |
| 2010/0130174 A1 | 5/2010 | Venkob | |
| 2010/0241964 A1 | 9/2010 | Belinsky | |
| 2010/0262666 A1 * | 10/2010 | Kalu | H04L 51/24 |
| | | | 709/206 |
| 2011/0002250 A1 | 1/2011 | Wang | |
| 2011/0037590 A1 * | 2/2011 | Kannan | H04W 76/50 |
| | | | 370/252 |
| 2011/0060996 A1 | 3/2011 | Alberth, Jr. | |
| 2011/0161987 A1 * | 6/2011 | Huang | G06Q 10/10 |
| | | | 719/318 |
| 2011/0260964 A1 * | 10/2011 | Mujkic | G06F 3/0481 |
| | | | 345/156 |
| 2012/0124147 A1 * | 5/2012 | Hamlin | H04L 51/16 |
| | | | 709/206 |
| 2012/0149342 A1 | 6/2012 | Cohen | |
| 2012/0150971 A1 * | 6/2012 | Bahrainwala | G06Q 10/107 |
| | | | 709/206 |
| 2012/0173635 A1 | 7/2012 | Wormald | |
| 2012/0179767 A1 | 7/2012 | Clarke | |
| 2012/0210334 A1 | 8/2012 | Sutedja | |
| 2012/0231770 A1 * | 9/2012 | Clarke | H04M 1/7243 |
| | | | 455/414.1 |
| 2012/0278732 A1 | 11/2012 | Lee | |
| 2012/0317222 A1 | 12/2012 | Almeida | |
| 2013/0007092 A1 * | 1/2013 | Gudmundsen | G06Q 50/18 |
| | | | 709/202 |
| 2013/0007665 A1 | 1/2013 | Chaudhri | |
| 2013/0024516 A1 | 1/2013 | Blinder | |
| 2013/0067015 A1 * | 3/2013 | Vasters | G06Q 10/107 |
| | | | 709/207 |
| 2013/0091223 A1 | 4/2013 | Deluca | |
| 2013/0091229 A1 * | 4/2013 | Dunn | H04L 67/22 |
| | | | 709/206 |
| 2013/0110836 A1 * | 5/2013 | Tomberg | G06Q 10/10 |
| | | | 707/737 |
| 2013/0111356 A1 * | 5/2013 | Vasudevan | H04M 1/27475 |
| | | | 715/753 |
| 2013/0198296 A1 * | 8/2013 | Roy | G06Q 10/107 |
| | | | 709/206 |
| 2013/0227384 A1 * | 8/2013 | Good | G06Q 30/0279 |
| | | | 715/205 |
| 2013/0325922 A1 | 12/2013 | Chaudhri | |
| 2013/0346408 A1 * | 12/2013 | Duarte | G06F 16/285 |
| | | | 707/737 |
| 2013/0346515 A1 | 12/2013 | Deluca | |
| 2013/0346922 A1 | 12/2013 | Shiplacoff | |
| 2014/0089406 A1 * | 3/2014 | Gniffke | H04L 67/147 |
| | | | 709/204 |
| 2014/0237387 A1 * | 8/2014 | Ryall | G06Q 10/1097 |
| | | | 715/753 |
| 2014/0273975 A1 | 9/2014 | Barat | |
| 2014/0280657 A1 * | 9/2014 | Miller | G06Q 30/02 |
| | | | 709/207 |
| 2014/0304238 A1 | 10/2014 | Halla-Aho | |
| 2014/0304616 A1 * | 10/2014 | Park | G06F 3/0488 |
| | | | 715/752 |

(56) References Cited

U.S. PATENT DOCUMENTS

| | | | |
|---|---|---|---|
| 2014/0310365 A1* | 10/2014 | Sample | H04L 51/16 709/206 |
| 2015/0019654 A1 | 1/2015 | Wheeler | |
| 2015/0026325 A1 | 1/2015 | Rheinheimer | |
| 2015/0074191 A1* | 3/2015 | Feng | H04L 67/26 709/204 |
| 2015/0177970 A1* | 6/2015 | Choi | H04W 4/12 715/752 |
| 2015/0249968 A1 | 9/2015 | Itamoto | |
| 2015/0263995 A1* | 9/2015 | Mahood | H04L 51/04 715/753 |
| 2015/0293886 A1 | 10/2015 | Mohanakrish nan | |
| 2015/0332062 A1 | 11/2015 | McReynolds | |
| 2015/0334072 A1 | 11/2015 | Agarwal | |
| 2015/0334118 A1* | 11/2015 | Yuan | H04M 1/72403 726/1 |
| 2015/0341900 A1* | 11/2015 | Jeong | H04L 51/24 455/458 |
| 2015/0350143 A1* | 12/2015 | Yang | G06F 16/9535 345/173 |
| 2016/0028677 A1* | 1/2016 | Narasimhan | H04L 67/16 709/203 |
| 2016/0057154 A1 | 2/2016 | Ferguson | |
| 2016/0063276 A1 | 3/2016 | Pycock | |
| 2016/0112358 A1 | 4/2016 | Ghafourifar | |
| 2016/0164810 A1 | 6/2016 | Wolz | |
| 2016/0188201 A1* | 6/2016 | Hosier, Jr. | G06F 3/04842 715/753 |
| 2016/0253089 A1* | 9/2016 | Lee | G06F 3/0488 345/173 |
| 2016/0269328 A1 | 9/2016 | Pola | |
| 2016/0330160 A1* | 11/2016 | Shan | H04L 65/4076 |
| 2016/0349999 A1* | 12/2016 | Adler | G06F 3/0604 |
| 2016/0353257 A1 | 12/2016 | Huang | |
| 2017/0005974 A1 | 1/2017 | Wheeler | |
| 2017/0006577 A1* | 1/2017 | Koum | H04L 51/24 |
| 2017/0017351 A1 | 1/2017 | Singh | |
| 2017/0054670 A1* | 2/2017 | Lee | H04L 51/24 |
| 2017/0078758 A1* | 3/2017 | Lewis | H04N 21/4667 |
| 2017/0178094 A1 | 6/2017 | Yu | |
| 2017/0185254 A1* | 6/2017 | Zeng | G06F 3/0482 |
| 2017/0238156 A1* | 8/2017 | Lewis | G06Q 30/00 340/540 |
| 2017/0257338 A1* | 9/2017 | Zhang | H04L 51/04 |
| 2017/0285882 A1 | 10/2017 | Hidinger | |
| 2017/0357975 A1 | 12/2017 | Moon | |
| 2017/0359778 A1 | 12/2017 | Chen | |
| 2017/0366491 A1* | 12/2017 | DeLuca | H04L 51/34 |
| 2017/0373997 A1 | 12/2017 | Deng | |
| 2017/0374004 A1 | 12/2017 | Holmes | |
| 2018/0007092 A1* | 1/2018 | Ham | H04L 65/1066 |
| 2018/0013800 A1* | 1/2018 | Morrison | H04L 65/403 |
| 2018/0061220 A1 | 3/2018 | Greene | |
| 2018/0063061 A1 | 3/2018 | Tian | |
| 2018/0083908 A1 | 3/2018 | Dotan-Cohen | |
| 2018/0101297 A1 | 4/2018 | Yang | |
| 2018/0130138 A1* | 5/2018 | Kumar | H04L 51/32 |
| 2018/0131660 A1* | 5/2018 | Lambert | G06Q 30/0202 |
| 2018/0212903 A1* | 7/2018 | Rose | G06F 16/955 |
| 2018/0324567 A1 | 11/2018 | Mao | |
| 2018/0352416 A1* | 12/2018 | Ryu | H04W 4/70 |
| 2018/0357063 A1* | 12/2018 | Kumar | H04L 12/1859 |
| 2019/0238489 A1* | 8/2019 | Cohen | H04L 51/14 |
| 2019/0342247 A1* | 11/2019 | Langholz | G06F 3/04817 |
| 2020/0272287 A1* | 8/2020 | Yang | H04L 51/22 |

* cited by examiner

510:

Message 1: "Hi team, Can someone volunteer to take the lead on this project?"

Message 2: "Hey team, Who can take the lead on this project?"

Same unique characters: H, i, t, e, a, m, n, s, o, k, h, l, d, p, r, j, c, <comma>, <space>, and <question mark>

Different unique characters: y, C, W, v, l, u

520:

Message 1: "Hi team, Can someone volunteer to take the lead on this project?"

Message 2: "Hey team, Who can take the lead on this project?"

Same total characters: H, i, t, e, a, m, a, n, t, a, k, e, t, h, e, l, e, a, d, o, n, t, h, i, s, p, r, o, j, e, c, t, o, e, <comma>, <space>, <space>, <space>, <space>, <space>, <space>, <space>, <space>, and <question mark>

Different total characters: i, y, C, W, h, c, s, o, m, e, o, n, e, v, o, l, u, n, t, e, r, t <space>, and <space>

530:

Message 1: "Hi team, Can someone volunteer to take the lead on this project?"

Message 2: "Hey team, Who can take the lead on this project?"

First matching portion: "H"

Second matching portion: " team,"

Third matching portion: "an "

Fourth matching portion: "take the lead on this project?"

FIG. 5

SYSTEMS AND METHODS FOR SUPPRESSING REPETITIVE NOTIFICATIONS ABOUT MESSAGES IN MESSAGING GROUPS

CROSS REFERENCES TO RELATED APPLICATIONS

This is a continuation of U.S. patent application Ser. No. 15/908,770, filed Feb. 28, 2018 (allowed), the disclosure of which is incorporated herein by reference.

TECHNICAL FIELD

The present disclosure relates generally to the field of collaboration and chat messaging. More specifically, and without limitation, this disclosure relates to systems and methods for suppressing repetitive notifications about messages in messaging groups.

BACKGROUND

Messages comprising text (as well as pictures, documents, hyperlink, files, or the like) may be send using many networking services, such as Short Message Service (SMS), Multimedia Messaging Service (MMS), one or more chat services (such as RingCentral® Glip™ or the like), or other networking services that permit exchange of messages between one or more recipients. Many extant services allow for sending messages to a group of recipients rather than a single recipient. In some services, such a message may be sent as separate messages, each individually addressed to a different recipient in the group of recipients. However, in other services, a messaging group formed of the group of recipients may be created such that replies to the initial message are sent to the group of recipients as well as the sender of the initial message.

In addition, some services allow for the creation of a messaging group through invitations or "invites." For example, a user of the service may submit a list of users to join in a messaging group, and the system may send invitations to each user on the list. Accordingly, the messaging group comprises the group of users who have accepted the invites to join the messaging group.

In messaging groups (also sometimes called a "chat groups") such as these, notifications of new messages may be sent to members of a messaging group. For example, a user may receive a push notification on an associated device. However, in some circumstances, a user may send the same (or a substantially similar) message to multiple messaging groups. If another user is in two or more of the multiple messaging groups, the other user may receive duplicate notifications regarding the message, one for each messaging group.

Moreover, many messaging services track whether a user has viewed (or "read") messages. Accordingly, the user may see an indicator that a message is unread if the user has not viewed it. However, if the user receives duplicate unread indicators regarding a same message (or substantially same message) sent to different messaging groups, extant systems require that the user manually view or otherwise mark as "read" each message.

SUMMARY

In view of the foregoing, disclosed systems and methods that suppress repetitive notifications for messages in messaging groups. In accordance with some embodiments, a first notification regarding a first message in a first messaging group may be sent while a second notification regarding a second message in a second messaging group may be suppressed when the first message and the second message match or substantially match. Moreover, in accordance with some embodiments, the second message may be marked as viewed or read when a user opens or otherwise views the first message (or vice versa).

According to an example embodiment of the present disclosure, a system for suppressing repetitive notifications about messages in messaging groups may include a memory storing instructions and a processor configured to execute the instructions. The instructions may include instructions to determine whether a first message in a first message group substantially matches a second message in a second message group; and after it is determined that a user associated with the first message group has accessed the first message, record the second message as a read message responsive to having determined that the same user is associated with the second message group.

According to another example embodiment of the present disclosure, a computer-implemented method for suppressing repetitive notifications about messages in messaging groups is described. The method may comprise determining whether a first message in a first message group substantially matches a second message in a second message group; and after it is determined that a user associated with the first message group has accessed the first message, noting the second message as a read message responsive to having determined that the same user is associated with the second message group.

According to yet another example embodiment of the present disclosure, a non-transitory computer-readable medium storing instructions for suppressing repetitive notifications about messages in messaging groups is described. The instructions, when executed by at least one processor, may cause the at least one processor to determine whether a first message in a first message group substantially matches a second message in a second message group; and after it is determined that a user associated with the first message group has accessed the first message, record the second message as a read message responsive to having determined that the same user is associated with the second message group.

It is to be understood that the foregoing general description and the following detailed description are example and explanatory only, and are not restrictive of the disclosed embodiments.

By suppressing repetitive notifications and eliminating repetitive manual steps for a user's interaction with a messaging service, embodiments of the present disclosure allow a user to use the messaging service most effectively and efficiently. Accordingly, embodiments of the present disclosure provide improvements over conventional messaging services.

BRIEF DESCRIPTION OF THE DRAWINGS

The accompanying drawings, which comprise a part of this specification, illustrate several embodiments and, together with the description, serve to explain the principles disclosed herein. In the drawings:

FIG. 5 is a diagram of example techniques for matching messages, according to an example embodiment of the present disclosure.

DETAILED DESCRIPTION

Figure 1:
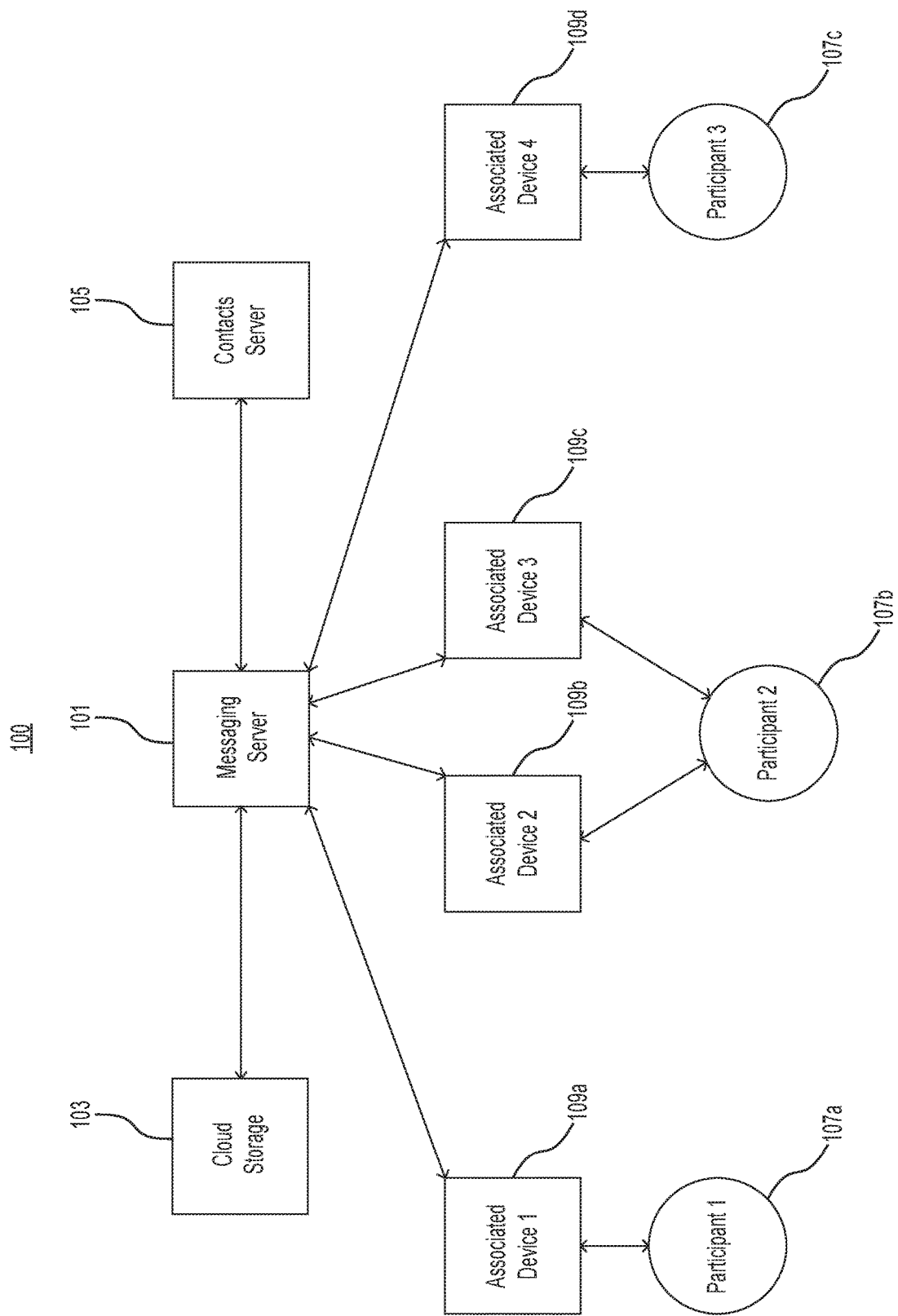
FIG. 1 is a block diagram of an example system for initiating and managing a messaging group with a plurality of recipients, according to an example embodiment of the present disclosure.

The disclosed embodiments relate to systems and methods for suppressing repetitive notifications about messages in messaging groups. Example embodiments of the present disclosure may be implemented using a general-purpose computer. Alternatively, one or more special-purpose computers may be built according to embodiments of the present disclosure using suitable logic elements.

According to an aspect of the present disclosure, a messaging group, managed by one or more applications on a server and/or on user devices, may have a plurality of recipients. In some embodiments, the messaging group may allow for the exchange of text (e.g., encoding using the American Standard Code for Information Interchange (ASCII), Unicode, or the like). Optionally, the messaging group may also allow for the exchange of images and/or other attachments (such as text files, pdf files, spreadsheets, executable files, audio files, video files, or the like). Accordingly, as used herein, the term "message" refers to any digital text, optionally including attachments such as multimedia and/or files, which are addressed to at least one recipient.

Each of the plurality of recipients may use at least an associated device to send messages to and receive messages from the messaging group. For example, an associated device may be a laptop computer, a desktop computer, a smartphone, a tablet, or any other device or combination of components capable of sending messages to and receiving messages from one or more applications (e.g., operating on a server or on the associated device) managing the messaging group (e.g., over one or more computer networks, such as a local area network (LAN), a 4G network, a Long-Term Evolution (LTE) network, an Ethernet network, or the like). The messages may be distributed to members of the messaging group via a messaging server (e.g., messaging server 701 of FIG. 7). As used herein, the term "messaging server" refers to one or more servers (which may reside on one or more server farms) executing one or more applications to facilitate exchanging of messages within a messaging group.

In certain aspects, a recipient may interact with the messaging group using a plurality of user devices. For example, a recipient may have a smartphone that executes an application permitting interaction with a messaging group as well as a laptop that executes a different instance of the same application (or a different application) permitting interaction with the same messaging group.

A recipient may be notified of messages sent to any messaging groups to which the recipient is a member through the associated device(s). For example, a recipient may receive a push notification (e.g., a graphical popup and/or a sound) when a new message is submitted to the messaging group. Additionally or alternatively, the application through which the recipient interacts with the messaging group may record (e.g., provide an indicator on a graphical user interface) if a message submitted to the messaging group is "new" or "unread." Accordingly, the application may further remove the new or unread record (and optionally replace it with an "old" or "read" record) after the recipient views the message (e.g., by clicking on the message, tapping on the message, or the like) or otherwise interacts with the message.

Figure 7:
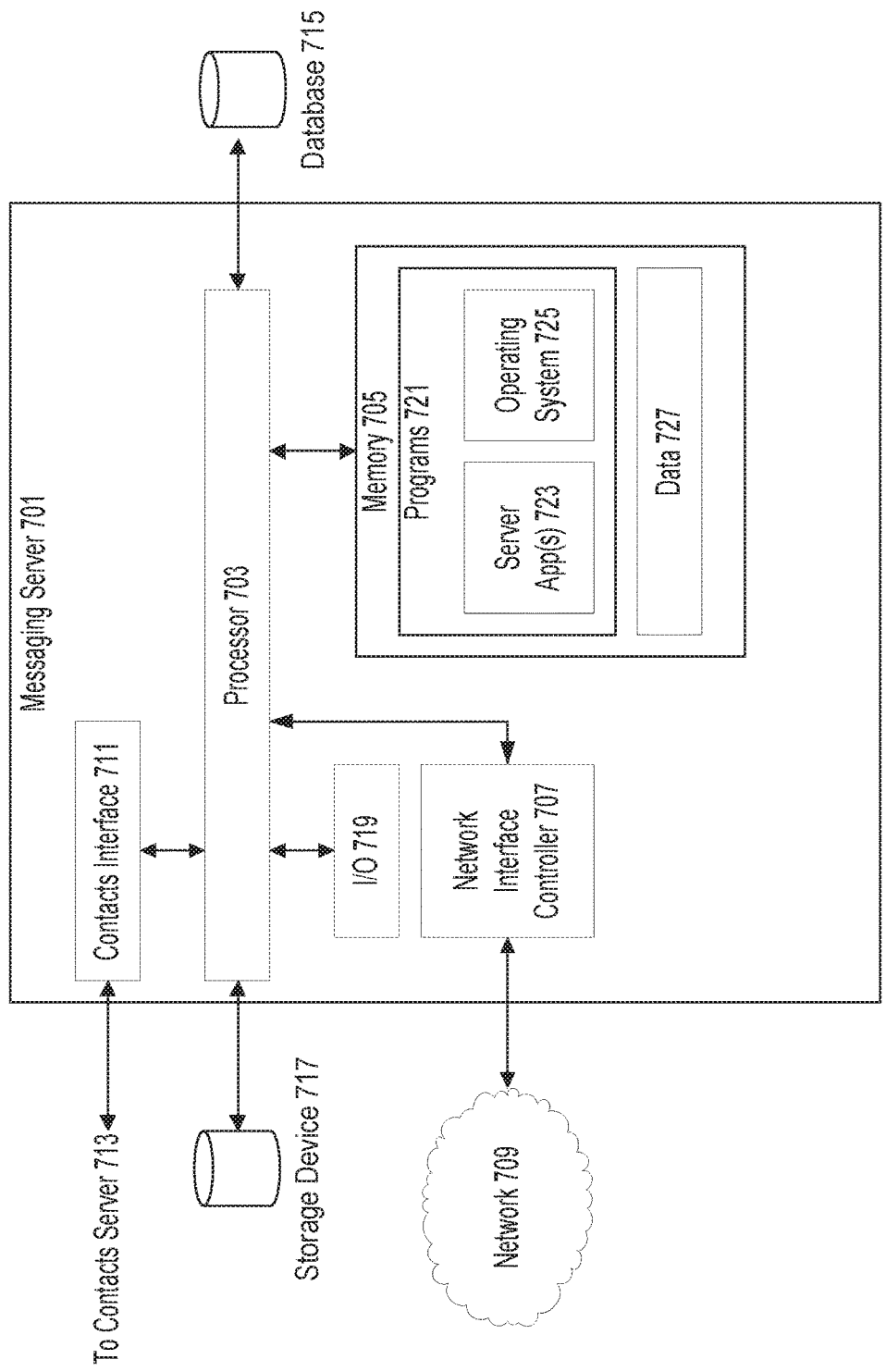
FIG. 7 is a block diagram of an example computing device with which the systems, methods, and apparatuses of the present invention may be implemented.

According to an aspect of the present disclosure, a processor (e.g., included in a messaging server such as messaging server 701 of FIG. 7) may determine whether a first message in a first message group matches a second message in a second message group. For example, the first message and the second message may be addressed to the first message group and the second message group, respectively. Additionally or alternatively, the first message may be addressed to a first plurality of recipients that are labeled as and/or determined by the processor as comprising the first message group, and the second message may be addressed to a second plurality of recipients that are labeled as and/or determined by the processor as comprising the second message group.

In some embodiments, the processor may receive the first message and/or the second message using a network interface controller (NIC). The NIC may communication over at least one computer network, such as the Internet, a local area network (LAN), or the like.

Additionally or alternatively, the processor may retrieve the first message and/or the second message from one or more memories. For example, the processor may access a volatile memory (such as random access memory (RAM)) or a non-volatile memory (such as a flash memory, hard disk drive, or the like).

As used herein, the term "match" refers to both a literal match between the contents of two messages and a substantial match between the contents of two messages. For example, a first string ("Can you help with this project?") and a second string ("Would you help with this project?") may not be literal matches but may be substantial matches.

A substantial match may be determined by one or more techniques. For example, the processor may compare matching unique characters between two strings to non-matching unique characters between the two strings. A "substantial" match may be determined by an absolute difference between unique matching characters and unique non-matching characters (e.g., at least 5, at least 10, at least 20, or the like more unique matching characters than unique non-matching characters), by a ratio between unique matching characters and unique non-matching characters (e.g., at least a ratio of 2:1, 3:1, 4:1, or the like between unique matching characters and unique non-matching characters), by a percentage by which the number of unique matching characters exceeds unique non-matching characters (e.g., at least 25%, 50%, 75%, or the like more unique matching characters than unique non-matching characters). Additionally or alternatively, a "substantial" match may be determined by a percentage of unique matching characters that account for a total number of unique characters in the first string and/or a total number of unique characters in the second string (e.g., at least 25%, 50%, 75%, or the like of the total number of unique characters in the first string and/or the second string are in the set of unique matching characters).

In another example, the processor may compare total matching characters between two strings to total non-matching characters between the two strings. A "substantial" match may be determined by an absolute difference between total matching characters and total non-matching characters (e.g., at least 5, at least 10, at least 20, or the like more total matching characters than total non-matching characters), by a ratio between total matching characters and total non-matching characters (e.g., at least a ratio of 2:1, 3:1, 4:1, or the like between total matching characters and total non-matching characters), by a percentage by which the number of total matching characters exceeds total non-matching characters (e.g., at least 25%, 50%, 75%, or the like more total matching characters than total non-matching characters). Additionally or alternatively, a "substantial" match may be determined by a percentage of total matching characters that account for a total number of characters in the first string and/or a total number of characters in the second string (e.g., at least 25%, 50%, 75%, or the like of the total number of characters in the first string and/or the second string are in the set of total matching characters).

In another example, the processor may compare one or more portions (a "portion" including at least two characters, five characters, ten characters, or the like) of the first string and the second string that form literal matches. A "substantial" match may be determined by an absolute counting of portions that literally match (e.g., at least 2, at least 3, at least 5, or the like total portions literally matching), by a ratio or percentage by which a length of one or more matching portions (e.g., a longest matching portion, all matching portions, or the like) account for a total length of the first string and/or the second string (e.g., at least 1:2, 1:3, 1:4, 25%, 50%, 75%, or the like of the length of the first string and/or the second string account for the length of the longest matching portion, all matching portions, or the like).

In yet another example, the processor may determine if one or more non-matching words between two strings comprise synonyms or otherwise have close meanings. For example, the processor may use natural language processing (NLP), one or more neural networks (discussed below), and/or other techniques for synonym recognition. The processor may then discard the synonymous words when performing the calculations described above or may include the synonymous words as matching when performing the calculations described above.

Any of the thresholds in the above examples may be set by the system (e.g., by default) or by one or more settings elected by a user of the system. Additionally or alternatively, the thresholds may be adjustable to improve performance. Any machine learning techniques may be used to perform the adjustments (e.g., based on reduction of one or more loss functions associated with the result of the calculations) and may, in some embodiments, incorporate user feedback to perform the adjustments.

Additionally or alternatively, the processor may use one or more neural networks to compare strings. By using one or more neural networks, the processor may account for synonyms and/or homonyms, for which character comparison may not adequately account. The processor may train the one or more neural networks one or more training sets and/or on messages received from one or more users. In some embodiments, the processor may request feedback from users for use in training the one or more neural networks. The neural networks may be implemented universally on the messaging server, may be customized by messaging group, and/or may be customized for each specific user. For example, one user may prefer that more messages may be marked as read, even if there are differences between them, and another user may prefer that fewer messages be marked as read, even if only a few words are replaced with synonyms. The training used and/or feedback requested may therefore depend on whether the neural networks are universal or customized.

In any of the embodiments above, the comparison may be case insensitive. For example, a first message string ("Can you help with this project?") and a second message string ("can you help with this project?") may be considered literal matches in a case insensitive comparison. Alternatively, in any of the embodiments above, the comparison may be case sensitive. For example, a first message string ("Can you help with this project?") and a second message string ("can you help with this project?") may not be considered literal matches in a case sensitive comparison (even though they may still be substantial matches).

In embodiments where the messages include attachments in addition to (or in lieu of text), the attachments may be disregarded by the processor in determining the match or may be incorporated in the matching technique. For example, the processor may compare the file name(s) of the attachment(s) and/or the contents of the attachment(s) using any of the embodiments described above. The thresholds used for comparing the text may differ from the thresholds used for comparing the attachments. For example, the processor may require a "substantial" match between text using a threshold of 25%, 50%, 75%, or the like while also requiring a literal matching between attachments.

Additionally or alternatively, the processor may account for recipients when determining a match. For example, the first message may match the second message when at least one recipient of the first message matches a recipient of the second message. In other words, at least one recipient of the first messaging group (to which the first message is addressed, whether directly or indirectly) may also be included in the second messaging group (to which the second message is addressed, whether directly or indirectly).

According to an aspect of the present disclosure, after it is determined that a user associated with the first message group has accessed the first message, the processor may record the second message as a read message responsive to having determined that the same user is associated with the second message group. For example, the user may be included in (or otherwise associated with) both the first message group and the second message group. Additionally or alternatively, both the first message and the second message may be addressed to the user, whether directly or indirectly by being addressed to the first message group and the second message group, respectively.

The processor may record the second message as read in one or more memories. Additionally or alternatively, the processor may record the second message as read graphically. For example, the processor may remove a graphical indicator previously indicating that the second message was unread and/or may generate (for display to the user) a graphical indicator indicating that the second message is read. Additionally or alternatively, the processor may modify a graphical indicator of unread messages (e.g., by reducing a number included or otherwise depicted in the graphical indicator by one to account for the second message being recorded as read).

In some embodiments, the processor further sends a notification regarding the first message to the user and suppresses a notification regarding the second message to the user. For example, the notification may include at least one of a graphical popup on a screen of the device associated with the user and a sound played by the device. Accordingly, the processor may send the notification to the device associated with the user, e.g., using a network interface controller (NIC). The NIC used to send the notification may be the same NIC used to receive the first message and/or the second message or a different NIC. In other embodiments, the notification is an audio or visual element, such as a count displayed in an application icon, a sound, etc.

Although described above using a messaging server, part or all of the steps above may be executed by a device associated with the recipient (e.g., a laptop computer, a desktop computer, a smartphone, a tablet, or the like). For example, the associated device may receive the first message in the first message group and the second message in the second message group, determine whether the first message matches the /second message, and record the second message as a read message after it is determined that the user associated with the device has accessed the first message. Moreover, the associated device may present the notification regarding the first message to the user (e.g., by displaying a graphical indicator and/or playing a sound) and may suppress the notification regarding the second message.

Turning now to FIG. 1, there is shown a system 100 for initiating and managing a messaging group with a plurality of recipients. As depicted in FIG. 1, system 100 may include a messaging server 101. Messaging server 101 may, for example, comprise one or more of messaging server 701 of FIG. 7. The one or more servers comprising messaging server 101 may be housed on one or more server farms.

In some embodiments, messaging server 101 may be operably connected to cloud storage 103 and/or contacts server 105. Although depicted as single elements in FIG. 1, cloud storage 103 and/or contacts server 105 may comprise one or more servers (e.g., similar to messaging server 701 of FIG. 7), which may be housed on one or more server farms.

Cloud storage 103 may comprise one or more services configured to remotely store files (such as images, videos, pdf files, executable files, or the like) and control access to the remotely stored files. For example, cloud storage 103 may store files owned by (and optionally shared with) one or more of participants 107a, 107b, and 107c. Accordingly, messaging server 101 may allow participants 107a, 107b, and/or 107c to directly use files to which the participant(s) have access in a message without having to first download the files from cloud storage 103 to a storage local to the participant(s).

Contacts server 105 may comprise one or more services configured to remotely store bundles of contact information and control access to the remotely stored contacts. For example, contacts server 105 may associate one or more of a name, a phone number, a physical address, an email address, or the like in a single bundle for storage as a single contact. Contacts server 105 may thus store contacts owned by (and optionally shared with) one or more of participants 107a, 107b, and 107c. Accordingly, messaging server 101 may allow participants 107a, 107b, and/or 107c to directly use contacts to which the participant(s) have access in a message (e.g., in text of a message and/or to address the message) and/or during creation of messaging group (e.g., to address invites to the messaging group) without having to separately access contacts server 105.

In the example of FIG. 1, participants 107a and 107c are connected to messaging server 101 via associated devices 109a and 109d, respectively. For example, participant 107a (and, similarly, participant 107c) may be connected via a smartphone, tablet, laptop computer, desktop computer, or the like. As further depicted in the example of FIG. 1, participants 107b is connected to messaging server 101 via associated devices 109b and 109c. For example, participant 107b may share use a laptop computer as well as a smartphone to connect to messaging server 101.

Accordingly, messaging server 101 may execute one or more applications that manage a messaging group including (or otherwise being associated with) participants 107a, 107b, and 107c. For example, messaging server 101 may support the exchange of messages between participants 107a, 107b, and 107c such that each message is seen by all of participants 107a, 107b, and 107c. In some embodiments, messaging server 101 may allow a participant (e.g., one of participants 107a, 107b, and 107c) to address a message to the messaging group, and messaging server 101 will then distribute the message to the other participants automatically based on a list of members included in (or otherwise associated with) the messaging group.

Additionally or alternatively, messaging server 101 may allow a participant to initialize a new messaging group. For example, a participant (e.g., one of participants 107a, 107b, and 107c) may send a command to messaging server 101 to form a messaging group. The command may include a list of participants to include (or otherwise associated with) the messaging group. In response to the command, messaging server 101 may form the messaging group with each participant on the list and/or send invites to each participant on the list. In embodiments with invites, each invite may include an option for the participant to join the messaging group (e.g., by following a hyperlink, such as a uniform resource locator (URL), or the like). Accordingly, the messaging group may include only participants that have accepted the invites.

Messaging server 101 may further allow for the creation of a messaging group in which different participants have different permissions. For example, a messaging group including participants 107a, 107b, and 107c may allow participants 107a and 107b to both send messages to and receive messages from the messaging group while participant 107c is only allowed to receive messages from the messaging group. Additionally or alternatively, participants 107a may be allowed to add new participants to and remove participants from the messaging group while participants 107b and 107c are not allowed to add and remove participants.

In some embodiments, a participant (e.g., one of participants 107a, 107b, and 107c) may have a plurality of contacts (e.g., a plurality of email addresses, a plurality of phone numbers, or the like). In such embodiments, messaging server 101 may allow for the participant to use more than one contact (e.g., two email addresses, an email address and a phone number, or the like) to receive updates from a messaging group.

Additionally or alternatively, messaging server 101 may track which contacts the participant uses in different messaging groups. For example, the participant may be a member of a first messaging group via an email address and a member of a second messaging group via a phone number. Messaging server 101 may record the same participant as a member of both groups or may record the memberships as distinct on account of their different contacts. The categorization may depend on system settings (e.g., default settings) or based on one or more preferences from the participant (e.g., received from a user device associated with the participant). For example, the system may, by default, group all email addresses together in the same record but group a phone number as distinct from an email address. In another example, the participant may request that all contacts except for a single phone number be included in the same record.

Figure 2:
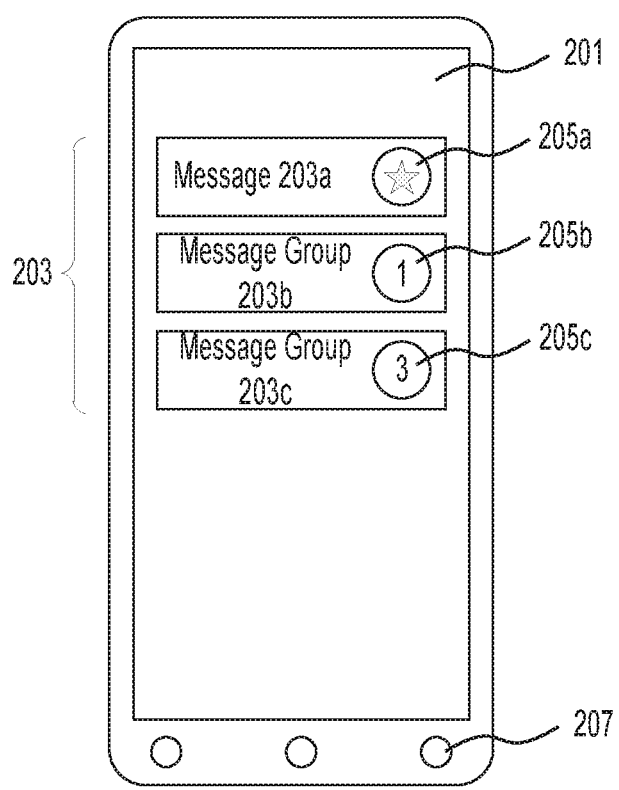
FIG. 2 is a diagram of an example graphical user interface for noting a message as an unread message, according to an example embodiment of the present disclosure.

FIG. 2 depicts an example graphical user interface (GUI) 200 for noting a message as an unread message. For example, GUI 200 may be displayed on a screen 201 of a device associated with a user.

As depicted in FIG. 2, GUI 200 may include a list 203 of messages addressed to the user and received by the device and/or message groups with which the user is associated. List 203 may further include indicators if a message is unread. For example, message 203a includes a graphical indicator 205a that message 203a is unread. Moreover, in the example of FIG. 2, message group 203b includes a graphical indicator 205b that at least one message in message group 203b is unread (message group 203c similarly includes graphical indicator 205c).

As further depicted in FIG. 2, the graphical indicators may include a number of unread messages. For example, indicator 205b includes a "1," indicating that message group 203b has 1 unread message. Moreover, indicator 205c includes a "3," indicating that message group 203c has 3 unread messages.

Figure 3:
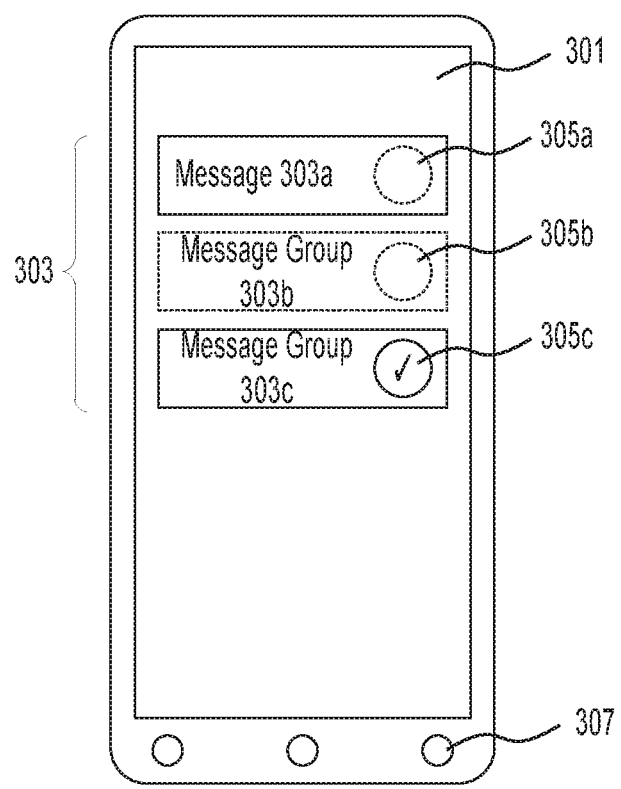
FIG. 3 is a diagram of an example graphical user interface for noting a message as a read message, according to an example embodiment of the present disclosure.

FIG. 3 depicts an example graphical user interface (GUI) 300 for noting a message as unread message. For example, GUI 300 may be displayed on a screen 301 of a device associated with a user.

As depicted in FIG. 3, GUI 300 may indicate that a message (e.g., message 303a) is read (or that a message group has no unread messages) by removing a corresponding unread indicator (e.g., missing indicator 305a). Additionally or alternatively, GUI 300 may indicate that a message group (e.g., message group 303b) has no unread messages (or that a message is read) by removing the message group (or message) from list 303 altogether (e.g., missing message group 303b and missing indicator 305b). Additionally or alternatively, GUI 300 may include a graphical indicator 305c that at least one message in message group 303c has no read messages (or that a message is read).

GUI 300 may, therefore, represent one or more modifications to GUI 200 that may be performed after a message (or a message group) is viewed (or otherwise interacted with) by the user. As used herein, the term "view" may include the user causing the generation of a GUI including the message by sending a command to generate the GUI via clicking (e.g., a mouse), hovering (e.g., a mouse), tapping (e.g., a touchscreen), or the like. For example, the user may enter the command, at least in part, using input device 207 of FIG. 2 or input device 307 of FIG. 3.

Figure 4A:
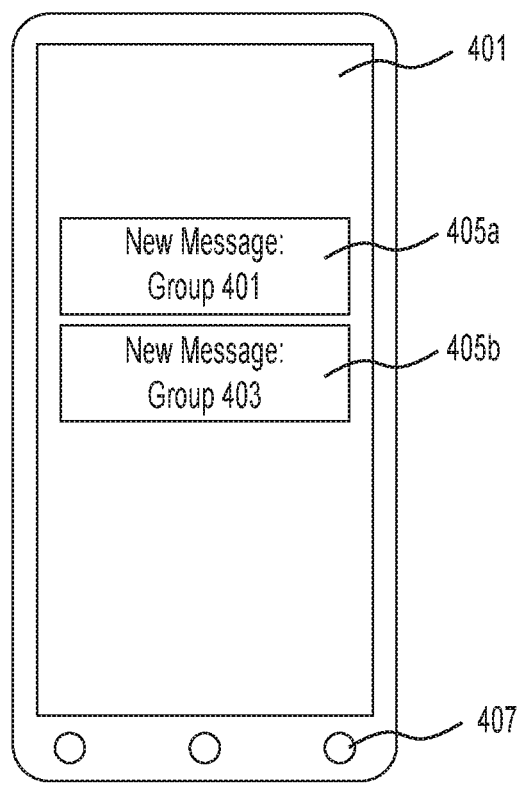
FIG. 4A is a diagram of an example device associated with a user displaying push notifications for new messages from a messaging group.

FIG. 4A depicts an example device 400 associated with a user displaying push notifications for new messages from a messaging group. For example, device 400 has a screen 401 that may be used to display push notifications 405a and 405b for new messages received for message groups 401 and 403, respectively. The user may view the messages corresponding to notifications 405a and 405b by interacting with screen 401 (if screen 401 is a touchscreen), by using input device 407, or the like.

Figure 4B:
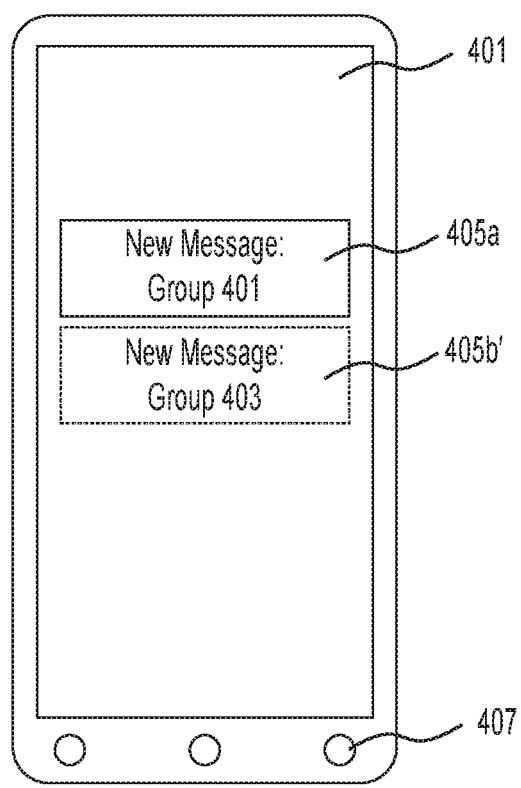
FIG. 4B is a diagram of an example device associated with a user displaying push notifications for new messages from a messaging group, according to an example embodiment of the present disclosure.

FIG. 4B depicts an example device 400' associated with a user displaying push notifications for new messages from a messaging group with repetitive push notification suppression. As depicted in FIG. 4B, screen 401 of device 400' only shows push notification 405a because push notification 405b has been suppressed. For example, device 400' (and/or a messaging server from which device 400' receives the new messages for message groups 401 and 403) may suppress push notification 405b by using method 600 of FIG. 6, described below.

FIG. 5 is a diagram of example techniques for matching messages. As depicted in FIG. 5, technique 510 may include determining matching unique characters and non-matching unique characters between Message 1 and Message 2. Accordingly, a "substantial" match may be determined by comparing the matching unique characters and non-matching unique characters, as explained above.

As further depicted in FIG. 5, technique 520 may include determining total matching characters and total non-matching characters between Message 1 and Message 2. Accordingly, a "substantial" match may be determined by comparing the total matching characters and total non-matching characters, as explained above.

As depicted in FIG. 5, technique 530 may include determining portions of Message 1 and Message 2 that form literal matches. In the example of FIG. 5, Message 1 and Message 2 have four portions that form literal matches. Accordingly, a "substantial" match may be determined based on the portions that form literal matches, as explained above.

Although all of the example techniques of FIG. 5 are case sensitive, any of the techniques depicted in FIG. 5 may be performed not-case sensitively. Moreover, although not depicted in FIG. 5, the processor may use one or more neural networks in combination with or in lieu of the techniques depicted in FIG. 5.

Figure 6:
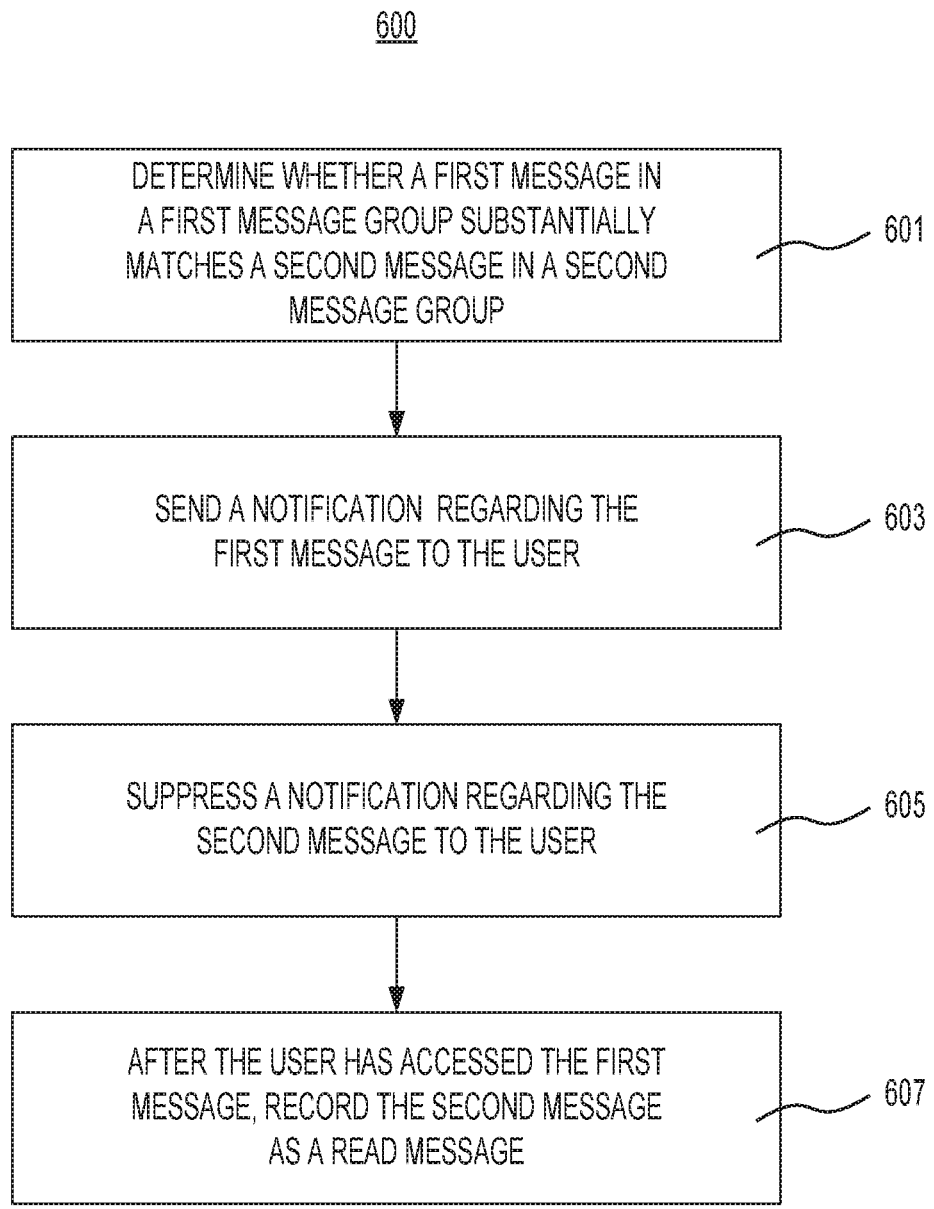
FIG. 6 is a flowchart of an example method for suppressing repetitive notifications about messages in messaging groups, according to an example embodiment of the present disclosure.

FIG. 6 is a flowchart of example method 600 for suppressing repetitive notifications about messages in messaging groups. Method 600 may be implemented using a general-purpose computer including at least one processor, e.g., messaging server 701 of FIG. 7. Alternatively, a special-purpose computer may be built for implementing method 600 using suitable logic elements.

At step 601, a processor may determine whether a first message in a first message group substantially matches a second message in a second message group. For example, the first message and the second message may be addressed to the first message group and the second message group, respectively.

Additionally or alternatively, the first message may be addressed to a first plurality of recipients comprising the first message group, and the second message may be addressed to a second plurality of recipients comprising the second message group. The first message and/or the second message addressed to respective pluralities may be labeled as addressed to the first message group and the second message group, respectively. Additionally or alternatively, the processor may determine, based on the respective pluralities, that the first message is addressed to the first message group and the second message is addressed to the second message group. For example, the processor may compare the respective pluralities to known lists of recipients included message groups and identify the corresponding message group when a plurality matches a list (or substantially matches a list, e.g., with a 95% match, 90% match, 85% match, 80% match, or the like). In embodiments where different participants in the first message group and/or the second message group have different permissions, the processor may remove recipients on the list that only have permission to read messages (and, accordingly, no permission to send messages) before performing the comparison.

In some embodiments, the processor may receive the first message and/or the second message using a network interface controller (NIC). The NIC may communication over at least one computer network, such as the Internet, a local area network (LAN), or the like. Additionally or alternatively, the processor may retrieve the first message and/or the second message from one or more memories.

At step 603, the processor may send a notification regarding the first message to the user. For example, the notification may include at least one of a graphical popup on a screen of the device associated with the user and a sound played by the device. Accordingly, the processor may send the notification to the device associated with the user, e.g., using a network interface controller (NIC). The NIC used to send the notification may be the same NIC used to receive the first message and/or the second message or a different NIC.

At step 605, the processor may suppress a notification regarding the second message to the user. For example, the processor may delete the notification regarding the second message or not generate the notification regarding the second message in the first place. In some embodiments, the processor may receive the notification regarding the first message and the notification regarding the second message. In such an embodiment, the processor may suppress the latter notification by discarding the notification rather than alerting the user to the notification (e.g., by displaying a graphic, by playing a sound, by vibrating, or the like).

At step 607, after it is determined that a user associated with the first message group has accessed the first message, the processor may record the second message as a read message responsive to having determined that the same user is associated with the second message group. For example, the user may be included in (or otherwise associated with) both the first message group and the second message group. Additionally or alternatively, both the first message and the second message may be addressed to the user, whether directly or indirectly by being addressed to the first message group and the second message group, respectively. Thus, the processor may determine that the user is associated with the first message group by determining that the first message is addressed to the user and that the first message includes an identification of the first message group (and similarly for determining that the user is associated with the second message group). Additionally or alternatively, the processor may determine that the user is associated with the first message group by determining that the first message is addressed to the first message group and that the user is included in a list of recipients associated with the first message group (and similarly for determining that the user is associated with the second message group). In embodiments where the processor is included in a device associated with the user, the processor may that the user is associated with the first message group because the device received the first message addressed to the first message group and the device is associated with the user (and similarly for determining that the user is associated with the second message group).

The processor may record the second message as read graphically. For example, the processor may remove a graphical indicator previously indicating that the second message was unread and/or may generate (for display on the device associated with the user) a graphical indicator indicating that the second message is read. Additionally or alternatively, the processor may modify a graphical indicator of unread messages (e.g., by reducing a number included or otherwise depicted in the graphical indicator) to account for the second message being recorded as read.

Step 603 and/or step 605 may be omitted from method 600. For example, the processor may neither send the notification regarding the first message nor suppress the notification regarding the second message. In another example, the processor may suppress the notification regarding the second message but not send the notification regarding the first message. For example, in an embodiment where method 600 is executed by a device associated with the user, the device may receive the notification regarding the first message and the notification regarding the second message from a messaging server (e.g., messaging server 701 of FIG. 7). Accordingly, the device may transit both notifications to the user or may suppress the second notification in response to determining whether the first message substantially matches the second message.

As explained above, FIG. 7 is a block diagram that illustrates an example messaging server 701 suitable for implementing the disclosed systems and methods. Messaging server 701 may reside on a single server farm or may be distributed across a plurality of server farms.

As depicted in FIG. 7, messaging server 701 may include at least one processor (e.g., processor 703), at least one memory (e.g., memory 705), and at least one network interface controller (NIC) (e.g., NIC 707).

Processor 703 may comprise a central processing unit (CPU), a graphics processing unit (GPU), or other similar circuitry capable of performing one or more operations on a data stream. Processor 703 may be configured to execute instructions that may, for example, be stored on memory 705.

Memory 705 may be volatile memory (such as RAM or the like) or non-volatile memory (such as flash memory, a hard disk drive, or the like). As explained above, memory 705 may store instructions for execution by processor 703.

NIC 707 may be configured to facilitate communication with messaging server 701 over at least one computing network (e.g., network 709). Communication functions may thus be facilitated through one or more NICs, which may be wireless and/or wired and may include an Ethernet port, radio frequency receivers and transmitters, and/or optical (e.g., infrared) receivers and transmitters. The specific design and implementation of the one or more NICs depend on the computing network 709 over which messaging server 701 is intended to operate. For example, in some embodiments, messaging server 701 may include one or more wireless and/or wired NICs designed to operate over a GSM network, a GPRS network, an EDGE network, a Wi-Fi or WiMax network, and a Bluetooth® network. Alternatively or concurrently, messaging server 701 may include one or more wireless and/or wired NICs designed to operate over a TCP/IP network.

Processor 703, memory 705, and/or NIC 707 may comprise separate components or may be integrated in one or more integrated circuits. The various components in messaging server 701 may be coupled by one or more communication buses or signal lines (not shown).

As further depicted in FIG. 7, messaging server 701 may include a contacts interface 711 configured to communicate with contacts server 713. Although depicted as separate in FIG. 7, contacts interface 711 may, in whole or in part, be integrated with NIC 707.

As depicted in FIG. 7, messaging server 701 may include and/or be operably connected to a database 715 and/or a storage device 717. Database 715 may represent a relational database, object database, document database, or other digital database, which may be stored, in whole or in part, on messaging server 701 and/or, in whole or in part, on a separate server (e.g., cloud storage 103 of FIG. 1). Storage device 717 may be volatile (such as RAM or the like) or non-volatile (such as flash memory, a hard disk drive, or the like).

I/O module 719 may enable communications between processor 703 and memory 705, database 715, and/or storage device 717.

As depicted in FIG. 7, memory 705 may store one or more programs 721. For example, programs 721 may include one or more server applications 723, such as applications that facilitate messaging groups, facilitate communications sessions using NIC 707, facilitate exchanges with contacts interface 711, or the like. By way of further example, programs 721 may include an operating system 725, such as DRAWIN, RTXC, LINUX, iOS, UNIX, OS X, WINDOWS, or an embedded operating system such as VXWorkS. Operating system 725 may include instructions for handling basic system services and for performing hardware dependent tasks. In some implementations, operating system 725 may comprise a kernel (e.g., UNIX kernel). Memory 705 may further store data 727, which may be computed results from one or more programs 721, data received from NIC 707, data retrieved from database 715 and/or storage device 717, and/or the like.

Each of the above identified instructions and applications may correspond to a set of instructions for performing one or more functions described above. These instructions need not be implemented as separate software programs, procedures, or modules. Memory 705 may include additional instructions or fewer instructions. Furthermore, various functions of messaging server 701 may be implemented in hardware and/or in software, including in one or more signal processing and/or application specific integrated circuits.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for suppressing repetitive notifications about messages in messaging groups, the system comprising:
   a memory storing instructions; and
   a processor configured to execute the instructions to:
   determine that contents of a first message addressed to a first message group substantially match contents of a second message addressed to a second message group, wherein the contents of the first message substantially match the contents of the second message when a first portion of the contents of the first message that comprises at least 75% of the contents of the first message is identical to a second portion of the contents of the second message that comprises at least 75% of the contents of the second message;
   send a notification regarding the first message to a user associated with the first message group and suppress a notification regarding the second message to the user;
   determine that the user associated with the first message group has accessed the first message; and
   in response to determining that the user associated with the first message group has accessed the first message, record the first message and the second message as read messages,
   wherein the first message is recorded as a first read message in a first application and wherein the second message is recorded as a second read message in a second application.

2. The system of claim 1, wherein the contents of the first message substantially match the contents of the second message when at least 75% of characters in the contents of the first message are identical to characters in the contents of the second message.

3. The system of claim 1, wherein the first message is recorded as a first read message using a first graphical indicator and wherein the second message is recorded as a second read message using a second graphical indicator.

4. The system of claim 3, wherein the first graphical indicator is different from the second graphical indicator.

5. The system of claim 1, wherein the notification is sent to a device associated with the user.

6. The system of claim 1, wherein the notification comprises at least one of a graphical popup on a screen of a device associated with the user and a sound played by the device.

7. A computer-implemented method for suppressing repetitive notifications about messages in messaging groups, the method comprising:
- determining that contents of a first message addressed to a first message group substantially match contents of a second message addressed to a second message group, wherein the contents of the first message substantially match the contents of the second message when a first portion of the contents of the first message that comprises at least 75% of the contents of the first message is identical to a second portion of the contents of the second message that comprises at least 75% of the contents of the second message;
- sending a notification regarding the first message to a user associated with the first message group and suppressing a notification regarding the second message to the user;
- determining that the user associated with the first message group has accessed the first message; and
- in response to determining that the user associated with the first message group has accessed the first message, recording the first message and the second message as read messages,
- wherein recording the first message comprises recording the first message as a first read message in a first application and wherein recording the second message comprises recording the second message as a second read message in a second application.

8. The method of claim 7, wherein the contents of the first message substantially match the contents of the second message when at least 75% of characters in the contents of the first message are identical to characters in the contents of the second message.

9. The method of claim 7, wherein the notification is sent to at least one of a smartphone, a tablet, or a personal computer associated with the user.

10. The method of claim 7, wherein recording the first message comprises using a first graphical indicator and wherein recording the second message comprises using a second graphical indicator.

11. The method of claim 10, wherein the first graphical indicator is different from the second graphical indicator.

12. A non-transitory, computer-readable medium storing instructions that, when executed by at least one processor, cause the at least one processor to:
- determine that contents of a first message addressed to a first message group substantially match contents of a second message addressed to a second message group, wherein the contents of the first message substantially match the contents of the second message when at least 75% of characters in the contents of the first message are identical to characters in the contents of the second message;
- send a notification regarding the first message to a user associated with the first message group and suppress a notification regarding the second message to the user;
- determine that the user associated with the first message group has accessed the first message; and
- in response to determining that the user associated with the first message group has accessed the first message, record the first message and the second message as read messages,
- wherein the first message is recorded as a first read message in a first application and wherein the second message is recorded as a second read message in a second application.

13. The non-transitory, computer-readable medium of claim 12, wherein the first message is recorded as a first read message using a first graphical indicator and wherein the second message is recorded as a second read message using a second graphical indicator.

14. The non-transitory, computer-readable medium of claim 13, wherein the first graphical indicator is different from the second graphical indicator.

* * * * *